US011222081B2

(12) United States Patent
Whigham et al.

(10) Patent No.: US 11,222,081 B2
(45) Date of Patent: Jan. 11, 2022

(54) OFF-LINE ELECTRONIC DOCUMENTATION SOLUTIONS

(71) Applicant: Evoqua Water Technologies LLC, Pittsburgh, PA (US)

(72) Inventors: Hillary Phillip Whigham, Meigs, GA (US); Patrick Harden, Thomasville, GA (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 224 days.

(21) Appl. No.: 16/199,785

(22) Filed: Nov. 26, 2018

(65) Prior Publication Data

US 2019/0163707 A1 May 30, 2019

Related U.S. Application Data

(60) Provisional application No. 62/590,713, filed on Nov. 27, 2017.

(51) Int. Cl.
*G06F 17/00* (2019.01)
*G06F 16/93* (2019.01)
*G06Q 10/06* (2012.01)
*G06F 21/60* (2013.01)
*G06F 21/62* (2013.01)

(52) U.S. Cl.
CPC ............ *G06F 16/94* (2019.01); *G06F 21/604* (2013.01); *G06F 21/6218* (2013.01); *G06Q 10/06316* (2013.01)

(58) Field of Classification Search
CPC ...... G06F 16/94; G06F 16/93; G06F 16/5854; G06F 21/604; G06F 21/6218; G06F 21/83; G06F 40/134; G06Q 10/06316
See application file for complete search history.

(56) References Cited

U.S. PATENT DOCUMENTS

| | | |
|---|---|---|
| 5,225,997 A | 7/1993 | Lederer et al. |
| 5,382,943 A | 1/1995 | Tanaka |
| 5,388,032 A | 2/1995 | Gill et al. |
| 5,400,246 A | 3/1995 | Wilson et al. |
| 5,870,698 A | 2/1999 | Riedel et al. |

(Continued)

OTHER PUBLICATIONS

Tai-Wei Kan, Chin-Hung Teng, and Wen-Shou Chou, Applying QR code in augmented reality applications, In Proceedings of the 8th International Conference on Virtual Reality Continuum and its Applications in Industry (VRCAI '09), Association for Computing Machinery, pp. 253-257, Dec. 2009.*

*Primary Examiner* — Greta L Robinson

(57) ABSTRACT

A portable electronic device comprises a camera, a display screen, and a processor configured to identify a piece of equipment from one of an image of the piece of equipment or of a fiducial marker associated with the piece of equipment captured by the camera, display a header page associated with the piece of equipment on the display screen responsive to identifying the piece of equipment, the header page including options for accessing different types of documentation associated with the piece of equipment, receive an indication from a user of a type of documentation to access, and responsive to receiving the indication of the type of documentation to access, retrieve the documentation from a local memory of the portable electronic device, and display the documentation on the display screen.

19 Claims, 19 Drawing Sheets

(56) References Cited

U.S. PATENT DOCUMENTS

| | | |
|---|---|---|
| 5,959,275 A | 9/1999 | Hughes et al. |
| 6,088,816 A | 7/2000 | Nouri et al. |
| 6,100,806 A | 8/2000 | Gaukel |
| 6,278,479 B1 | 8/2001 | Wilson et al. |
| 6,281,790 B1 | 8/2001 | Kimmel et al. |
| 6,396,534 B1 | 5/2002 | Mahler et al. |
| 6,437,691 B1 | 8/2002 | Sandelman et al. |
| 6,553,336 B1 | 4/2003 | Johnson et al. |
| 6,611,866 B1 | 8/2003 | Goldman |
| 6,714,977 B1 | 3/2004 | Fowler et al. |
| 6,925,350 B2 | 8/2005 | Watanabe |
| 7,024,474 B2 | 4/2006 | Clubb et al. |
| 7,058,471 B2 | 6/2006 | Watanabe |
| 7,372,451 B2 | 5/2008 | Dempski |
| 7,450,248 B2 | 11/2008 | Fujieda et al. |
| 7,456,736 B2 | 11/2008 | Primm et al. |
| 7,506,264 B2 | 3/2009 | Polan |
| 7,519,909 B2 | 4/2009 | Kuiawa et al. |
| 7,529,387 B2 | 5/2009 | Kotake et al. |
| 7,561,717 B2 | 7/2009 | Anderson |
| 7,587,080 B1 | 9/2009 | Good |
| 8,351,680 B2 | 1/2013 | Kalteis |
| 8,369,217 B2 | 2/2013 | Bostica et al. |
| 8,577,120 B1 | 11/2013 | Koshti |
| 9,639,984 B2 | 5/2017 | Mullins |
| 10,402,211 B2 * | 9/2019 | Lu ................. G06F 3/0482 |
| 2001/0047410 A1 | 11/2001 | Defosse |
| 2002/0043969 A1 | 4/2002 | Duncan et al. |
| 2002/0071031 A1 | 6/2002 | Lord et al. |
| 2002/0161885 A1 | 10/2002 | Childers et al. |
| 2003/0011647 A1 | 1/2003 | Abbondanzio et al. |
| 2003/0033550 A1 | 2/2003 | Kuiawa et al. |
| 2003/0090503 A1 | 5/2003 | Leapman |
| 2004/0160897 A1 | 8/2004 | Fowler et al. |
| 2004/0163102 A1 | 8/2004 | Fowler et al. |
| 2005/0071093 A1 | 3/2005 | Stefan |
| 2005/0071444 A1 | 3/2005 | Motoyama |
| 2005/0242189 A1 | 11/2005 | Rohs |
| 2005/0246436 A1 | 11/2005 | Day et al. |
| 2005/0276444 A1 | 12/2005 | Zhou et al. |
| 2006/0028488 A1 | 2/2006 | Gabay et al. |
| 2006/0038833 A1 | 2/2006 | Mallinson et al. |
| 2006/0087402 A1 * | 4/2006 | Manning ........ G05B 19/41875 340/3.1 |
| 2006/0238339 A1 | 10/2006 | Primm et al. |
| 2007/0030824 A1 | 2/2007 | Ribaudo et al. |
| 2007/0088823 A1 | 4/2007 | Fowler et al. |
| 2007/0092161 A1 | 4/2007 | Aratani et al. |
| 2007/0287473 A1 | 12/2007 | Dupray |
| 2008/0215727 A1 | 9/2008 | Denis et al. |
| 2008/0263150 A1 | 10/2008 | Childers et al. |
| 2008/0317021 A1 | 12/2008 | Ives et al. |
| 2009/0083808 A1 * | 3/2009 | Morrison ......... H04N 21/41407 725/87 |
| 2009/0113323 A1 | 4/2009 | Zhao et al. |
| 2009/0121860 A1 | 5/2009 | Kimmel et al. |
| 2010/0150425 A1 | 6/2010 | Kalteis |
| 2011/0037712 A1 | 2/2011 | Kim et al. |
| 2011/0138416 A1 | 6/2011 | Kang et al. |
| 2011/0138444 A1 | 6/2011 | Kang et al. |
| 2011/0191454 A1 | 8/2011 | Joukov |
| 2011/0218730 A1 * | 9/2011 | Rider .................... G01C 21/00 701/533 |
| 2011/0241833 A1 | 10/2011 | Martin et al. |
| 2012/0026530 A1 | 2/2012 | Tsongas et al. |
| 2012/0075343 A1 | 3/2012 | Chen et al. |
| 2012/0236161 A1 | 9/2012 | Kwon et al. |
| 2012/0243743 A1 | 9/2012 | Pastor et al. |
| 2012/0249588 A1 | 10/2012 | Tison et al. |
| 2012/0311438 A1 * | 12/2012 | Cranfill ................ G06F 3/0488 715/256 |
| 2012/0313963 A1 | 12/2012 | Chen-Quee et al. |
| 2013/0024785 A1 | 1/2013 | Van Wie |
| 2013/0026220 A1 * | 1/2013 | Whelihan ........... G06F 16/9554 235/375 |
| 2013/0031202 A1 | 1/2013 | Mick et al. |
| 2013/0038633 A1 | 2/2013 | Maggiore |
| 2013/0069985 A1 | 3/2013 | Wong et al. |
| 2013/0120449 A1 | 5/2013 | Ihara et al. |
| 2013/0162632 A1 | 6/2013 | Varga et al. |
| 2013/0169681 A1 | 7/2013 | Rasane et al. |
| 2013/0283260 A1 * | 10/2013 | Chen ...................... G06F 8/63 717/174 |
| 2014/0028712 A1 | 1/2014 | Keating et al. |
| 2014/0147021 A1 | 5/2014 | Wang et al. |
| 2014/0203071 A1 | 7/2014 | Eggert |
| 2014/0270477 A1 | 9/2014 | Coon |
| 2015/0043887 A1 | 2/2015 | Gurudoss et al. |
| 2015/0187137 A1 | 7/2015 | Mullins |
| 2015/0213325 A1 | 7/2015 | Krishnamoorthi et al. |
| 2015/0302650 A1 | 10/2015 | Abdelmoati et al. |
| 2015/0325047 A1 | 11/2015 | Conner et al. |
| 2016/0327293 A1 | 11/2016 | Grabowski et al. |
| 2017/0249745 A1 * | 8/2017 | Fiala ..................... G06T 7/277 |
| 2018/0129656 A1 * | 5/2018 | Crawford .......... G06K 7/10237 |
| 2021/0049534 A1 * | 2/2021 | Nagatomo ............ G06Q 10/00 |

* cited by examiner

OFF-LINE ELECTRONIC DOCUMENTATION SOLUTIONS

CROSS-REFERENCE TO RELATED APPLICATIONS

This application claims priority under 35 U.S.C. § 119(e) to U.S. Provisional Patent Application Ser. No. 62/590,713, titled OFF-LINE ELECTRONIC DOCUMENTATION SOLUTIONS, filed Nov. 27, 2017, the entirety of which is incorporated by reference herein for all purposes.

BACKGROUND

1. Field of Invention

Aspects and embodiments of the present disclosure are directed to systems and methods for accessing documentation related to process equipment in the field using off-line electronic documentation solutions.

2. Discussion of Related Art

When servicing or inspecting process equipment a technician may desire to access various documentation regarding the process equipment, for example, an operation and maintenance manual, a parts reorder form, or videos or other training material regarding servicing the equipment. In some instances, such documentation may be available on-line, for example, through the website of a vendor of the process equipment. In remote locations without Wi-Fi or other easily accessible internet access, a technician may have to travel to access physical copies of such documentation when needed, if such physical copies are even available.

SUMMARY

In accordance with an aspect of the present disclosure, there is provided a portable electronic device. The portable electronic device comprises a camera, a display screen, and a processor configured to identify a piece of equipment from one of an image of the piece of equipment or of a fiducial marker associated with the piece of equipment captured by the camera, display a header page associated with the piece of equipment on the display screen responsive to identifying the piece of equipment, the header page including options for accessing different types of documentation associated with the piece of equipment, receive an indication from a user of a type of documentation to access, and responsive to receiving the indication of the type of documentation to access, retrieve the documentation from a local memory of the portable electronic device, and display the documentation on the display screen.

In some embodiments, the processor is configured to identify the piece of equipment by extracting identification information from the image of the fiducial marker. The fiducial marker may be one of a bar code and a quick response code. The processor may be configured to identify the piece of equipment by searching a database in the local memory of the portable electronic device associating different identification information with different pieces of equipment.

In some embodiments, the processor is configured to identify the piece of equipment by comparing the image of the piece of equipment to a library of three-dimensional models of a plurality of pieces of equipment stored in the local memory of the portable electronic device.

In some embodiments, the portable electronic device further comprises a user interface configured to receive an order for a replacement part for the equipment, wherein the processor is further configured to store the order for the replacement part in the local memory of the portable electronic device while a network connection is unavailable to the electronic device. The processor may be further configured to transmit the order for the replacement part when a network connection becomes available to the portable electronic device.

In some embodiments, the portable electronic device further comprises a user interface configured to receive a service request for the equipment, wherein the processor is further configured to store the service request in the local memory of the portable electronic device while a network connection is unavailable to the electronic device. The processor may be further configured to transmit the service request when a network connection becomes available to the portable electronic device.

In accordance with another aspect, there is provided a system comprising a plurality of pieces of equipment, a set of identifiers, each of the plurality of pieces of equipment being associated with a different identifier in the set of identifiers, and a portable computing device including a camera, a display screen, and a processor configured to identify a piece of equipment from an image of the identifier associated with the piece of equipment captured by the camera, retrieve equipment documentation from a local memory of the portable computing device, and display the documentation on the display screen.

In some embodiments, the processor of the portable computing device is further configured to display a header page associated with the piece of equipment on the display screen responsive to identifying the piece of equipment, the header page including options for accessing different types of documentation associated with the piece of equipment. The processor of the portable computing device may be further configured to receive an indication from a user of a type of documentation to access. The processor of the portable computing device may be further configured to retrieve the equipment documentation responsive to receiving the indication of the type of documentation to access.

In some embodiments, each of the plurality of pieces of equipment has the identifier affixed thereto.

In some embodiments, the set of identifiers is printed on a sheet of paper unaffixed to any of the plurality of pieces of equipment.

In accordance with another aspect, there is provided a method of facilitating off-line accessing equipment information. The method comprises providing a portable electronic device including the equipment information stored in a local memory of the portable electronic device, providing an identifier of the equipment, and providing instructions to capture an image of the identifier of the equipment with a camera of the portable electronic device and select a type of equipment information to view from a menu of different types of information associated with the piece of equipment displayed on a user interface of the portable electronic device responsive to capturing the image of the identifier of the equipment.

In some embodiments, the method further comprises providing instructions to affix the identifier of the equipment to the equipment.

In some embodiments, the method further comprises downloading the equipment information from a computer system of a vendor of the equipment to the portable electronic device. The method may further comprise downloading the equipment information from the computer system of the vendor of the equipment to a removable memory device that is later coupled to the portable electronic device. The computer system of the vendor may determine what equipment to download information for based on a maintenance or service job number provided to the computer system of the vendor.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
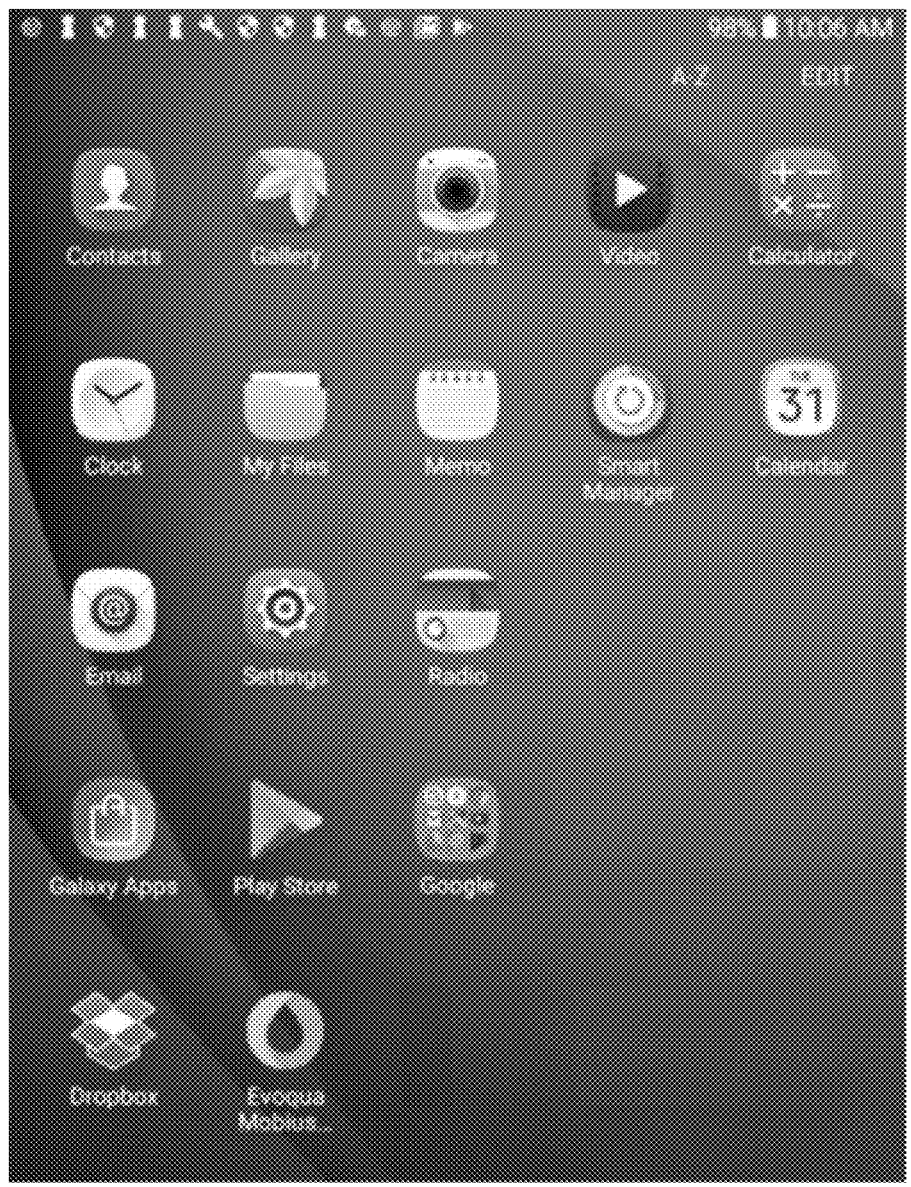
FIG. 1 is a screen shot of a display of a portable electronic device including a software application as disclosed herein installed.

This disclosure is not limited in its application to the details of construction and the arrangement of components set forth in the following description or illustrated in the drawings. The disclosed systems and methods are capable of other embodiments and of being practiced or of being carried out in various ways.

Aspects and embodiments disclosed herein include the provision of access to product and project interactive documents with the use of a software application, or "app", running on a portable off-line electronic device such as a tablet, for example, a Samsung Galaxy™ tablet or an Apple iPad® tablet, a smart phone, or another form of portable electronic device. Aspects and embodiments disclosed herein provide for a user to access documentation or information regarding equipment in the field or parts associated with same without having to search through a voluminous operation and maintenance manual (O&M manual) to get information.

Aspects and embodiments disclosed herein are described as being implemented on a tablet, however, it should be recognized that these aspects and embodiments may also or alternatively be implemented on other forms of portable electronic devices, for example, smartphones, laptop computers, head mounted displays such as Google Glass™ display, or any other form of portable electronic device known in the art. The terms "portable electronic device" and "portable computing device" are used interchangeably herein. In various embodiments, a tablet or other portable electronic device may include a touch screen or other input mechanism through which a user may interact with controls or data entry fields of embodiments of the app displayed on the tablet or other portable electronic device. As the term is used herein, the memory of a portable electronic device may include permanently installed memory, for example, a hard drive or solid state memory, or removable memory devices, for example, a flash drive or Secure Digital (SD) card.

A user may open an embodiment of the app on a portable electronic device and may optionally be required to authenticate using a password, fingerprint, or some other security feature if security is an important consideration. In one embodiment, once a user's credentials are entered in the app, they don't need to be entered again. In yet another embodiment, no credentials may be required at all. Additionally or alternatively, information from the portable electronic device, for example an IP address or user ID may automatically be sent to a security access system upon opening the app when a Wi-Fi signal or internet access is available and the user may be granted access to functionality for interacting with various types or individual units of equipment commensurate with a previously established security level.

In various embodiments, a user may utilize a camera included in a portable electronic device to identify a piece of equipment that the user wishes to access documentation or information pertaining to. By opening the app and pointing the camera of the portable electronic device at a fiducial marker disposed on the piece of equipment or otherwise associated with the piece of equipment the information is pulled from memory of the portable electronic device and displayed for view and interaction by the user. As the term is used herein a fiducial marker is an object, code, or symbol placed in the field of view of an imaging system, for example, a camera of a smartphone or tablet which is associated with an object, piece of equipment, or part (hereinafter referred to collectively as a piece of equipment) and serves to identify piece of equipment. No internet or connection to the outside is needed for embodiments of the app to work. This technology could be used in manufacturing processes, commissioning processes, and in a field service environment where an individual would normally refer to a paper or electronic document for information.

In one embodiment, a fiducial marker, for example, a Quick Response Code (QR code), is placed on a piece of equipment and the fiducial marker acts as an identifier for the piece of equipment. The fiducial marker may itself encode information regarding the equipment type of a piece of equipment and/or a serial or model number of the piece of equipment or may include an identification number that is associated with information regarding the piece of equipment (for example, model number and/or serial number) in a look-up table or database in the memory of the portable electronic device. Additionally or alternatively, a set of fiducial markers may be printed on a piece of paper along with the corresponding equipment types or equipment model numbers and a technician may read the fiducial marker for a particular piece of equipment from the piece of paper rather than from the piece of equipment. In the present disclosure, QR codes are describes as a type of marker that may serve as a fiducial marker on a piece of equipment for an app and which may encode information for the device, for example, a unique ID or identifier of a device. It should be understood however, that in any of the aspects or embodiments disclosed herein, a fiducial marker may be additionally or alternatively implemented using, for example, a bar code, any form of matrix code known in the art, a unique image, a reCAPTCHA, text, or any other optically ascertainable information containing a code or symbol.

In further embodiments, the portable device may use machine vison or pattern matching to identify a piece of equipment from an image of the piece of equipment captured by the camera of the portable electronic device. Images or information regarding the shapes of various pieces of equipment (for example, wireframe or other forms of three-dimensional models) may be stored in the memory of the portable electronic device and the portable electronic device may match a captured image of the piece of equipment to the image information in the memory to identify the type or model number of the piece of equipment.

In another embodiment, a piece of equipment may be equipped with a near-field communication (NFC) transmitter that announces itself allowing the portable electronic device to identify the piece of equipment via wireless communications directly between the portable electronic device and piece of equipment.

Aspects and embodiments disclosed herein take a time-consuming process of finding information about equipment of interest to a user and streamlines this process with the use of a portable electronic device (for example, an electronic tablet or smart phone). Typically, a user or technician who wants operational or maintenance information on a piece of equipment has to thumb through a multi-page O&M manual to find the specific information they are looking for. With the aspects and embodiments disclosed herein, this information can be found instantly. There is no requirement for portable electronic device upon which aspects and embodiments of the software app disclosed herein is run to have access to a network or internet connection.

In some embodiments, prior to entering the field or travelling to a site to check or service one or more pieces of equipment, a user or technician may acquire electronic copies of the most recent versions of documentation regarding the various pieces of equipment the user or technician expects to interact with. The most recent versions of documentation regarding the various pieces of equipment data may be loaded from a vendor's internal system (for example, a server or servers including a database of equipment documentation) to a flash drive or SD card. Once the SD card is loaded into the portable electronic device and the app is opened the data is transferred from the SD card onto the portable electronic device where it is then accessible via the application. In other embodiments, the most recent versions of documentation regarding the various pieces of equipment may be downloaded directly into internal memory of the portable electronic device while the portable electronic device has access, wireless or wired, to the vendor's internal system.

In some embodiments, a particular service or maintenance operation may be assigned a job number by a vendor. All equipment that a user or technician is expected to interact with during the service or maintenance operation may be associated with the job number in the internal system of the vendor. To access and download the documentation related to the equipment that a user or technician is expected to interact with during the service or maintenance operation, the user may enter the job number in a download request field of the application while the portable electronic device is connected to the vendor's internal system by a wired or wireless communication link.

Aspects and embodiments will be discussed with further detail with reference to the appended figures.

The software application disclosed herein may be downloaded from the website of a vendor for a particular type or set of equipment or from a publicly accessible software download source, for example, the Google Play Store or Apple App Store. An icon for the app may then appear on a screen or user interface of the portable electronic device, for example, the "Evoqua Mobius" icon illustrated in the display in FIG. 1. The electronic documentation associated with one or more pieces of equipment may be separately downloaded from the internal system of a vendor for the one or more pieces of equipment. If an end user is to use the app to interact with equipment bought from or leased from a vendor the electronic documentation associated with the equipment, or access to same through the internal system of the vendor, may be provided by the vendor to the end user along with the equipment. The vendor may supply the end user with a portable electronic device pre-loaded with the app and/or documentation associated with equipment purchased or leased from the vendor.

Figure 2:
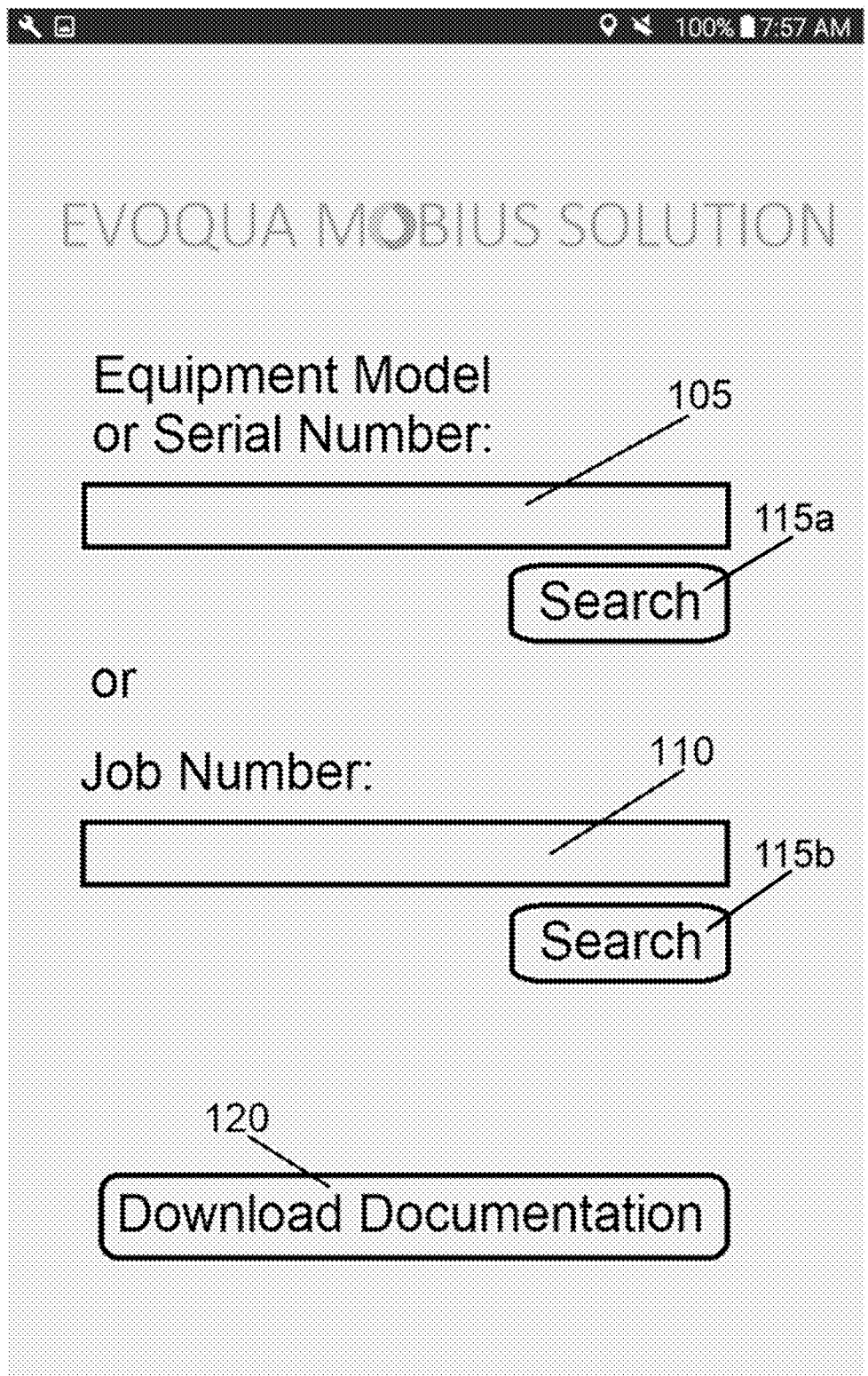
FIG. 2 illustrates a documentation download request screen displayed on an embodiment of a portable electronic device running an embodiment of the software application disclosed herein.

In embodiments in which electronic documentation associated with a piece or pieces of equipment which a user or technician is expected to interact with during a service or maintenance operation is stored on an external location, for example, an internal system of a vendor for the equipment, the user or technician may access and download the electronic documentation through a download screen of the app, for example, as illustrated in FIG. 2. The user or technician may specify an equipment model or serial number (text entry field 105) or a job number (text entry field 110) to access and download the correct documentation. Search buttons 115a, 115b may be provided for the user or technician to search for equipment by type, model number, or job number. A download button 120 may be actuated to initiate download of the documentation once the equipment model or serial number or job number has been identified.

In embodiments in which electronic documentation for one or more pieces of equipment are pre-loaded onto a removeable memory device, for example, a flash drive or SD card, during startup of the application the app looks for the files to be transferred from the flash drive or SD card. This feature makes updating O&M data very easy.

Figure 3:
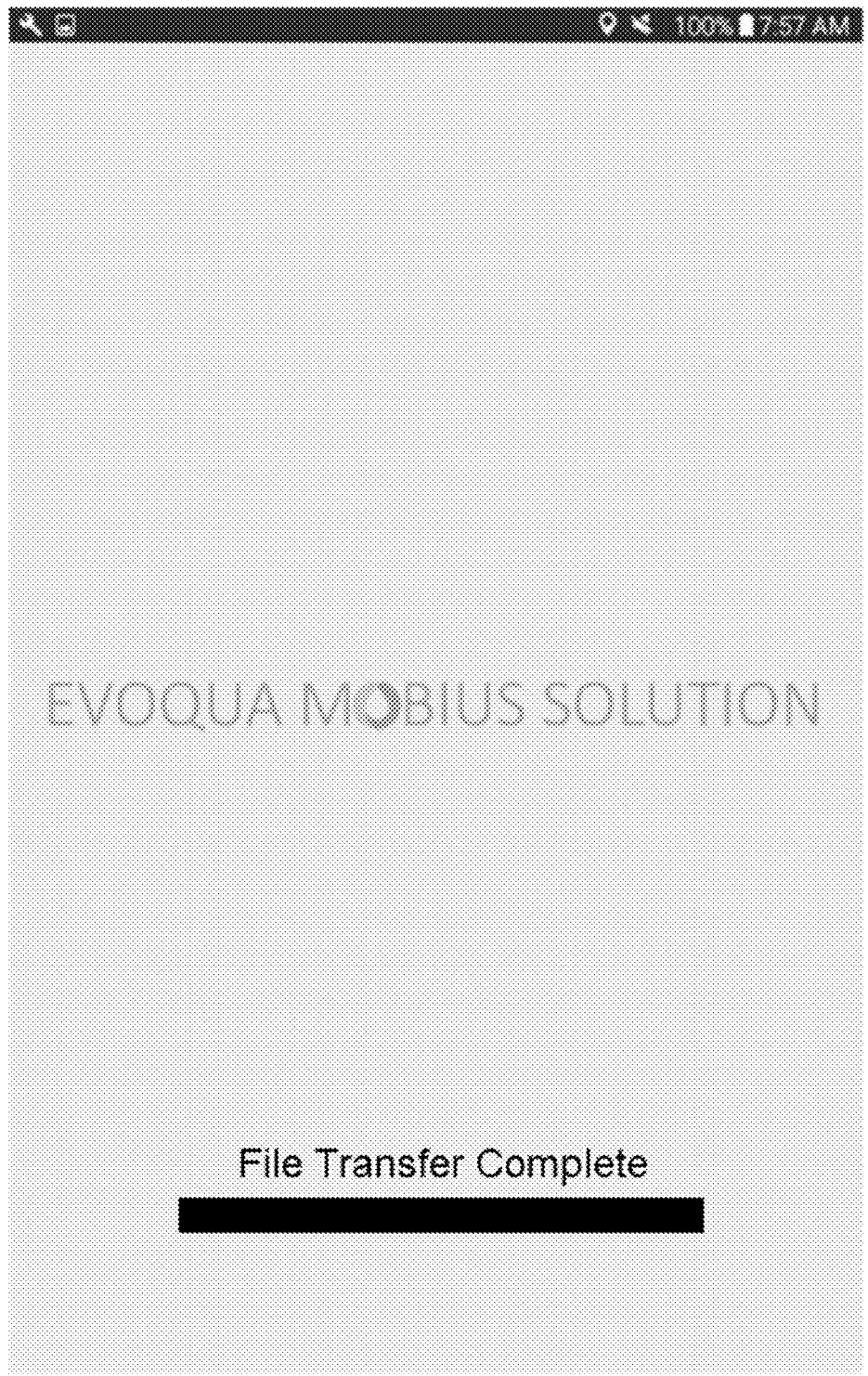
FIG. 3 illustrates a file transfer indicator screen displayed on an embodiment of a portable electronic device running an embodiment of the software application disclosed herein.

After the electronic documentation for the one or more pieces of equipment is downloaded from the external system or uploaded from the removeable memory device, the app displays a screen providing an indication of same, for example, as illustrated in FIG. 3.

Figure 4A:
FIG. 4A illustrates a home screen displayed on an embodiment of a portable electronic device running an embodiment of the software application disclosed herein.
Figure 4B:
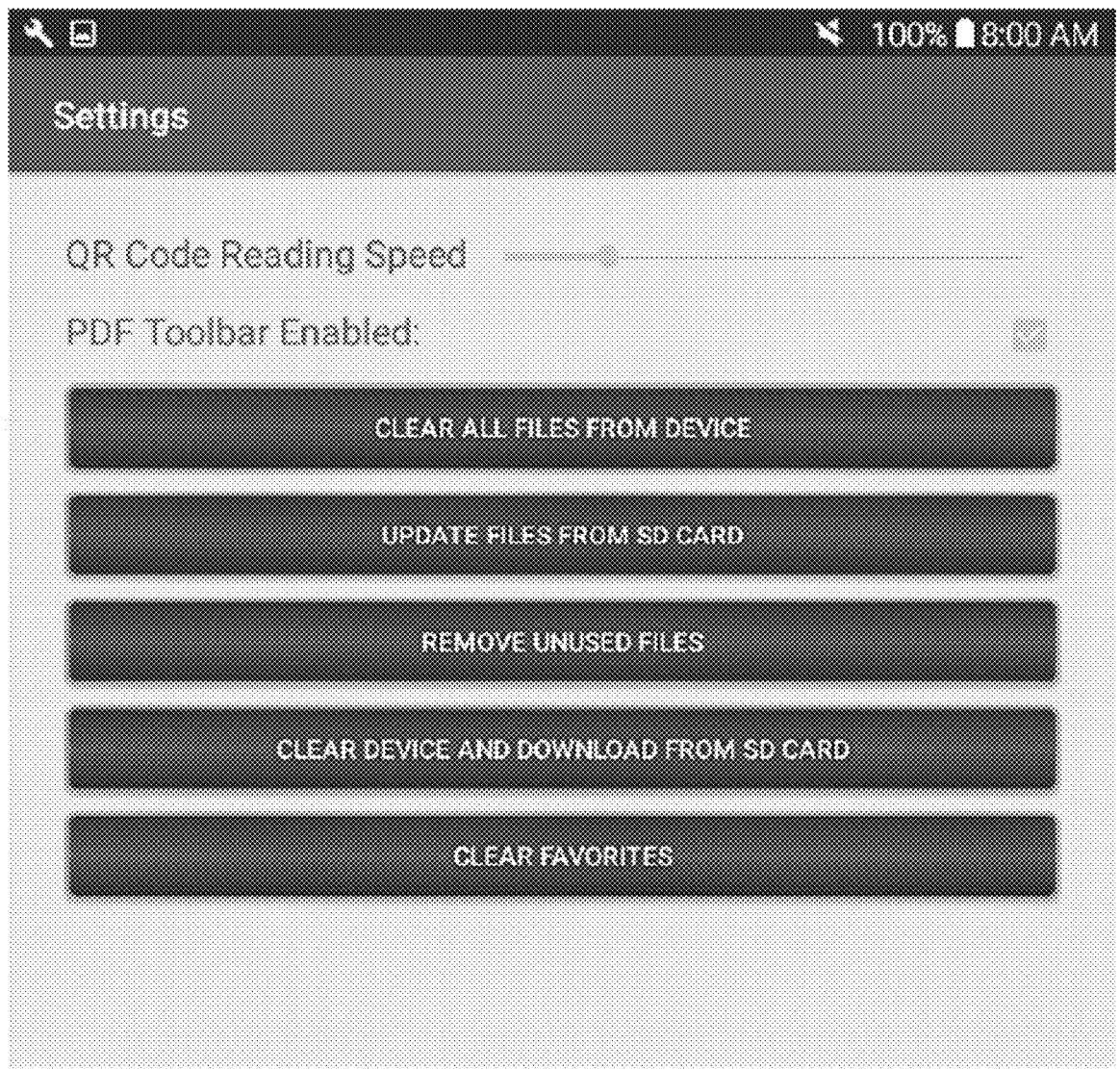
FIG. 4B illustrates a settings selection screen displayed on an embodiment of a portable electronic device running an embodiment of the software application disclosed herein.

Once the application has completed the file transfer, the home screen of the app will appear. On the home screen the application automatically begins searching for a QR code via a camera of the portable electronic device, for example, a camera on the opposite side of the portable electronic device from the display/user interface (the rear camera). In some embodiments, there are four buttons at the bottom of the screen, each which give the user options as to how to find the information they are looking for. These buttons may include a "Favorites" button. One or more previously opened documents can be tagged as a favorite and may be stored in memory of the portable electronic device and accessible through the "Favorites" button. A "Manual Input" button allows the user to enter a part number or equipment model number to find information about a particular part or piece of equipment. A "Browse Files" button may be selected by the user to provide for the user to browse all the files loaded in the portable electronic device associated with their project/equipment. A "Settings" button may provide access to a configuration menu which may allow the user to adjust various application settings. A user selecting the "Settings" button can access and change functions such as how fast the QR scanner reads a QR code, enable and disable the PDF toolbar (which allows for access to bookmarks (if applicable) and the annotation tool), clear all files from the device, update files, remove unused files, or clear favorites. (FIG. 4B.) An embodiment of the home screen of the app illustrated in FIG. 4A shows a potential layout of the buttons discussed above. In FIG. 4A the portable electronic device home screen also provides a message 405 that it is searching for a QR code.

Figure 5A:
FIG. 5A illustrates an image of a piece of equipment including a quick response code displayed on an embodiment of a portable electronic device running an embodiment of the software application disclosed herein.
Figure 5B:
FIG. 5B illustrates a group of quick response codes for different types of equipment printed on a piece of paper.

Once the application is open the user may point the camera of the portable electronic device at a QR code which has been placed on the part or piece of equipment (FIG. 5A) or at a QR code associated with a model or particular serial number of a piece of equipment printed on a piece of paper (FIG. 5B). Once a QR code has been detected the app may provide indicator dots 505 (FIG. 5B) or another form of highlighting of the identified QR code in the display of the portable electronic device.

Figure 6A:
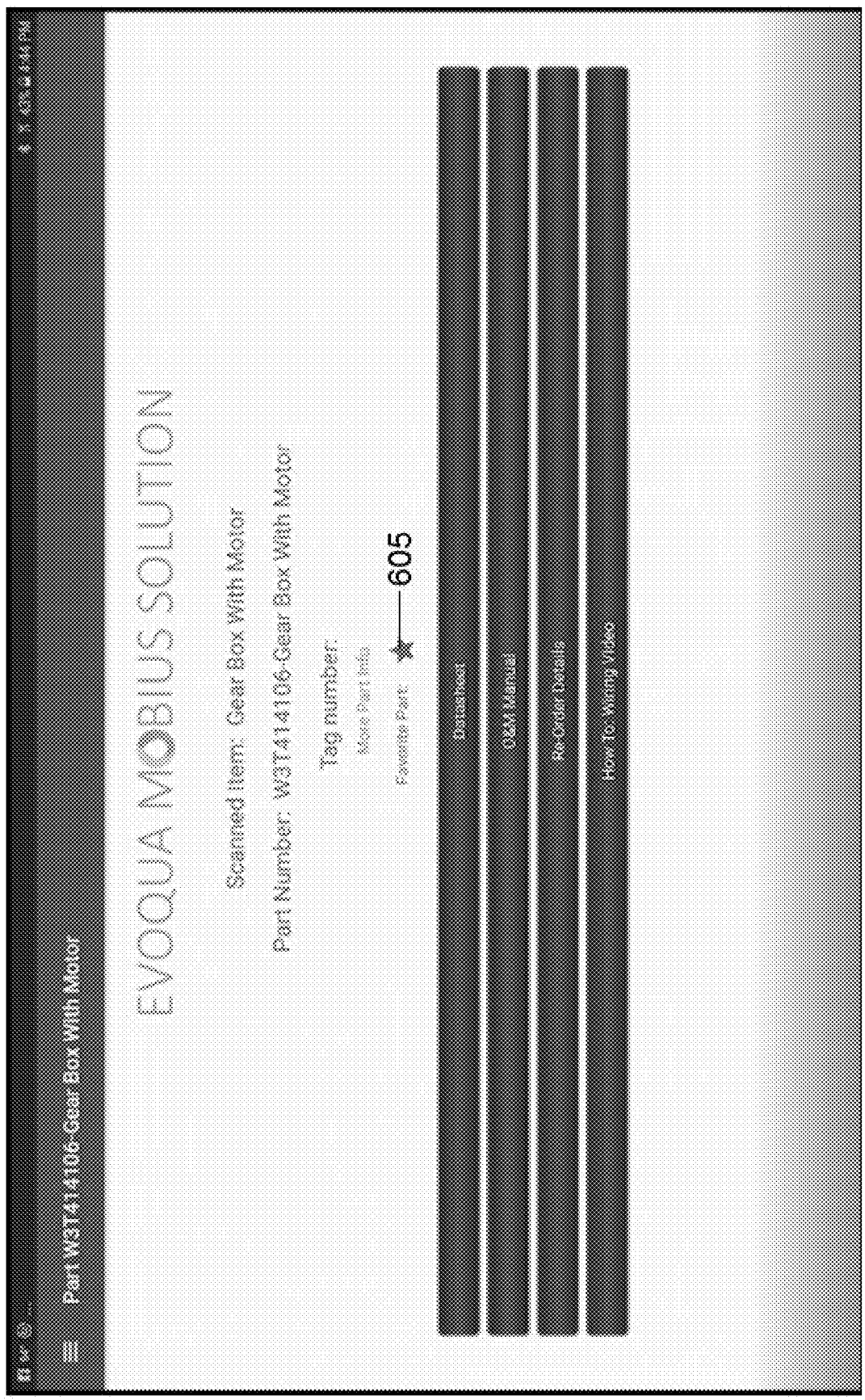
FIG. 6A illustrates a header page for a type of equipment displayed on an embodiment of a portable electronic device running an embodiment of the software application disclosed herein.
Figure 6B:
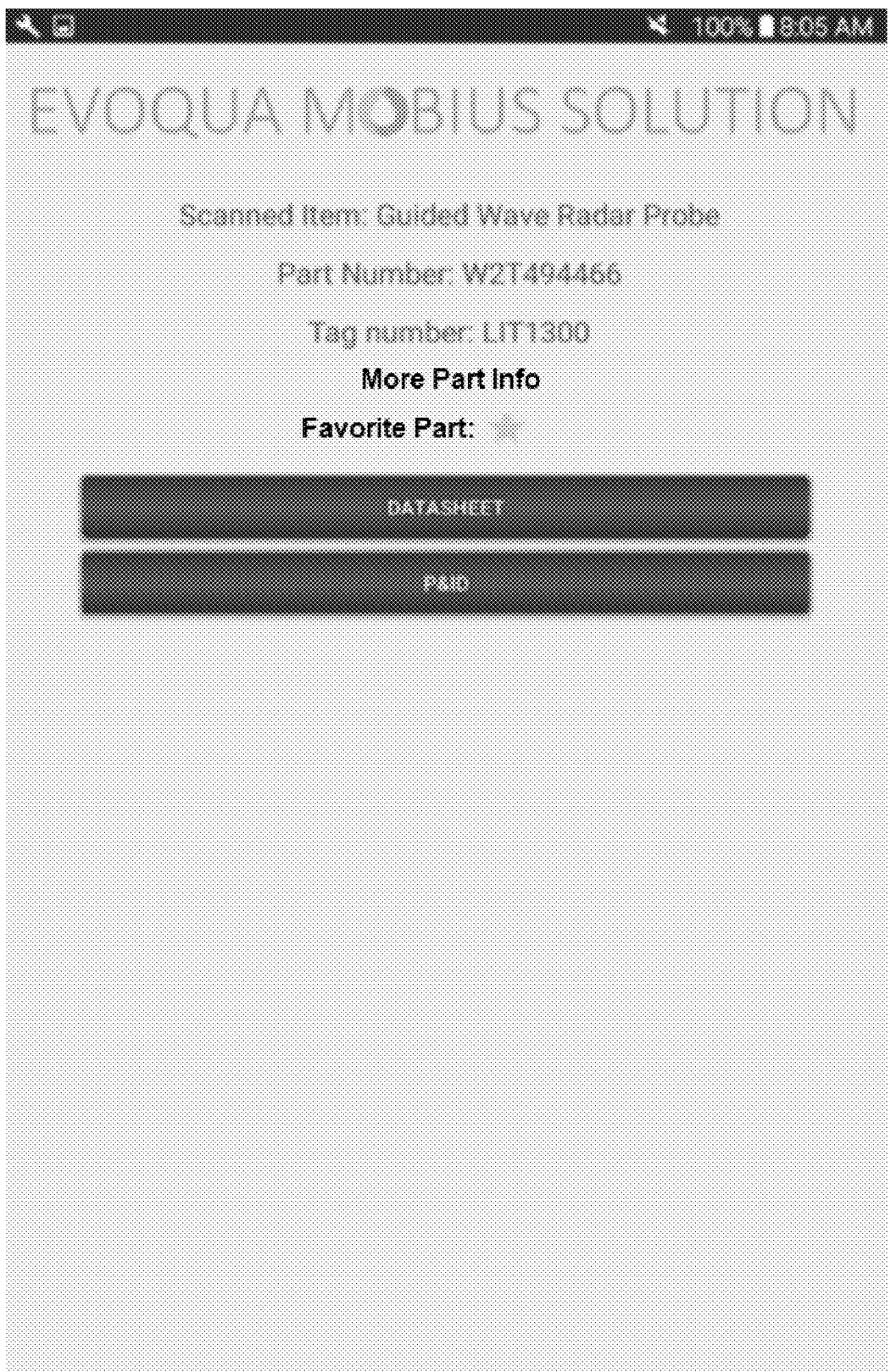
FIG. 6B illustrates a header page for another type of equipment displayed on an embodiment of a portable electronic device running an embodiment of the software application disclosed herein.
Figure 6C:
FIG. 6C illustrates a screen shot of an instructional video displayed on an embodiment of a portable electronic device running an embodiment of the software application disclosed herein.

Responsive to identifying a QR code associated with a particular piece of equipment, the application automatically opens the header page for that specific equipment and displays buttons that may be actuated to access pertinent information associated with that equipment. In the example illustrated in FIG. 6A, the app has identified a piece of equipment as a "Gear Box With Motor", has identified the part number of the "Gear Box With Motor" and provides buttons though which a user may access a data sheet for the equipment, an O&M Manual for the equipment, check details regarding re-ordering of parts for the equipment, or access a video illustrating how to perform maintenance on the wiring of the "Gear box With Motor." A frame from an example maintenance instruction video is illustrated in FIG. 6C. In the example illustrated in FIG. 6B, the app has identified a piece of equipment as a "Guided Wave Radar Probe" and has identified the equipment part number and tag number. Below the information available for this equipment are buttons that a user may select to access a Data Sheet or a piping and instrumentation diagram (P&ID) for the equipment. The app may provide different amounts or types of information for different equipment. In the example illustrated in FIG. 6A no tag number or P&ID were available for the equipment scanned, while this information was available for the equipment scanned in the example of FIG. 6B.

Figure 7A:
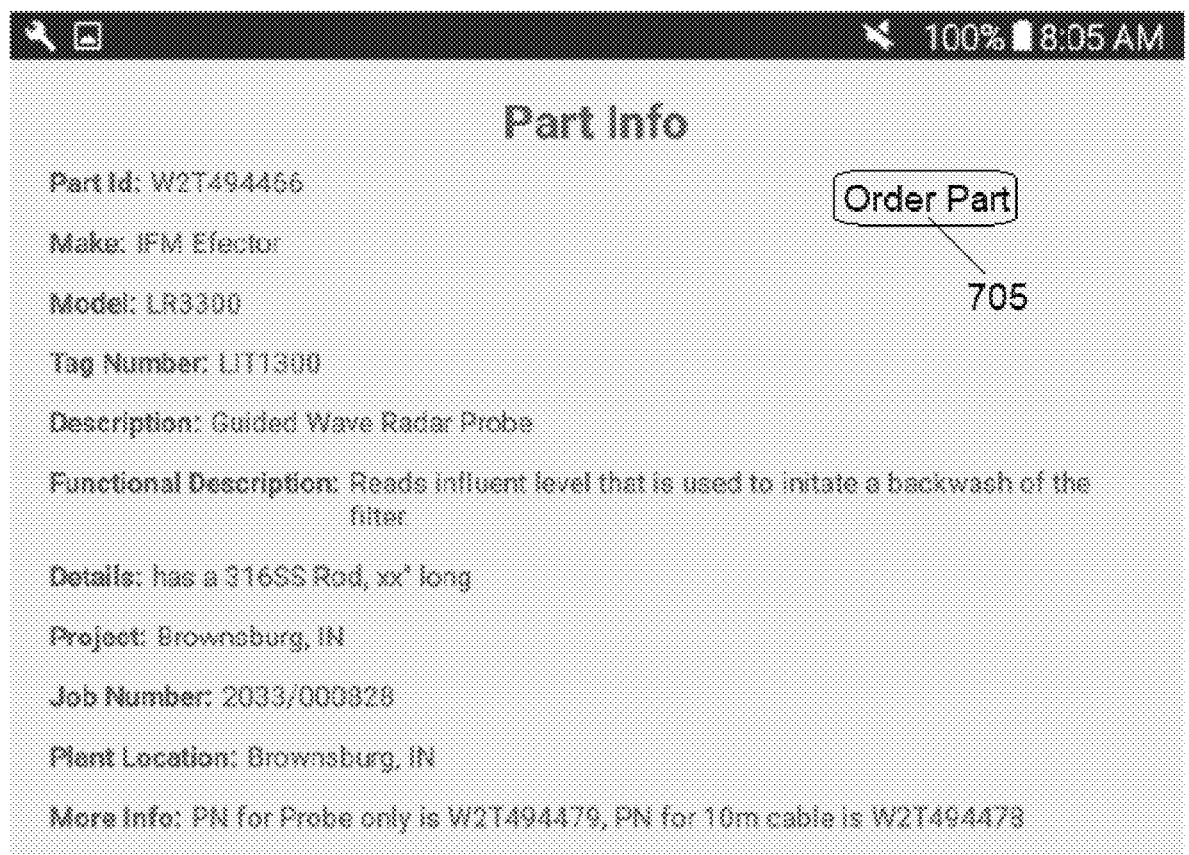
FIG. 7A illustrates a part information screen displayed on an embodiment of a portable electronic device running an embodiment of the software application disclosed herein.
Figure 7B:
FIG. 7B illustrates an example of a Parts/Service order form.

If a user is interested in more information about a piece of equipment, the user can select the "More Part Info" link on the header page for a piece of equipment and the app will take them to a page that looks like the example shown in FIG. 7A in which details about a scanned part is provided. In some embodiments, the "Part Info" screen may include an "Order Part" button 705 that a user may select to access a Parts/Service order form which will be filled out with all specific product/part information. One example of a Parts/Service order form is illustrated in FIG. 7B. The user may submit the form directly from the app whenever Wi-Fi or wired network or internet access or a connection to a system of a vendor for the part becomes available. The Parts/Service order form may then be sent out to the vendor as an order or request for quote (RFQ).

Figure 8:
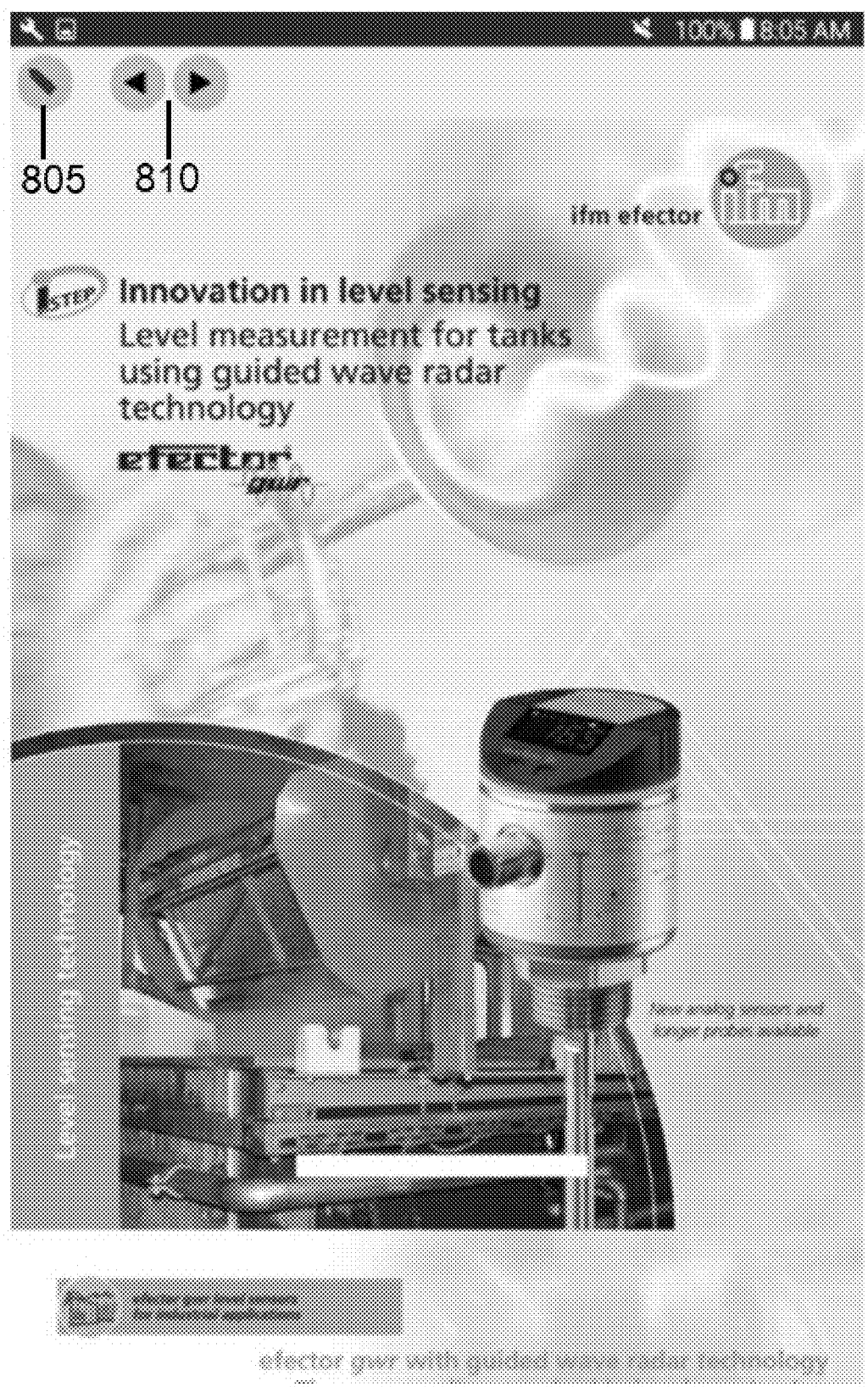
FIG. 8 illustrates an equipment data sheet displayed on an embodiment of a portable electronic device running an embodiment of the software application disclosed herein.

If the user selects the "Data Sheet" button in the header page for a scanned piece of equipment, a portable document format (PDF) document illustrating the Data Sheet for the equipment would open. The first page of a Data Sheet for the "Guided Wave Radar Probe" identified in the header page of FIG. 6B is illustrated in FIG. 8. A user may page through the electronic Data Sheet by selecting the page forward and page backward buttons 810 at the top of the data sheet page illustrated in FIG. 8. Additionally or alternatively, the user can scroll through the Data Sheet by drawing a finger up and down over the display/user interface of the portable electronic device if the display/user interface is a touch-screen display. In some embodiments, the app may recognize bookmarks that are embedded in PDFs for quick access to specific information by selecting the bookmarks.

Figure 9:
FIG. 9 illustrates an equipment data sheet including markups made by a user displayed on an embodiment of a portable electronic device running an embodiment of the software application disclosed herein.

If the user wants to mark up the electronic Data Sheet, the user may select the pen icon 805 at the top of the data sheet page. Selection of the pen icon 805 activates a virtual pen that the user can use to mark up the data sheet, for example, to make notes or identify a part that may need further inspection in the future. One example of a marked-up data sheet is illustrated in FIG. 9. Marked-up data sheets are automatically stored in memory of the portable electronic device when the user disables the virtual pen, for example, by selecting the "X" button 905 on the top of the data sheet screen in FIG. 9. In some embodiments, a marked-up data sheet may be included in a service request to a vendor of the equipment or part illustrated in the data sheet. The user may submit the service request directly from the app whenever Wi-Fi or wired network or internet access or a connection to a system of a vendor for the equipment or part becomes available. The service request may then be sent out to the vendor as an order or RFQ.

Each part or piece of equipment scanned or located manually by browsing the files or entering a part number can be added to a favorites list accessible by selecting the "Favorites" button on the home screen of the app (FIGS. 4A, 5A, 5B) or by selecting the star icon at the top of the header page for that part or equipment. (Element 605 in FIG. 6A.)

Figure 10:
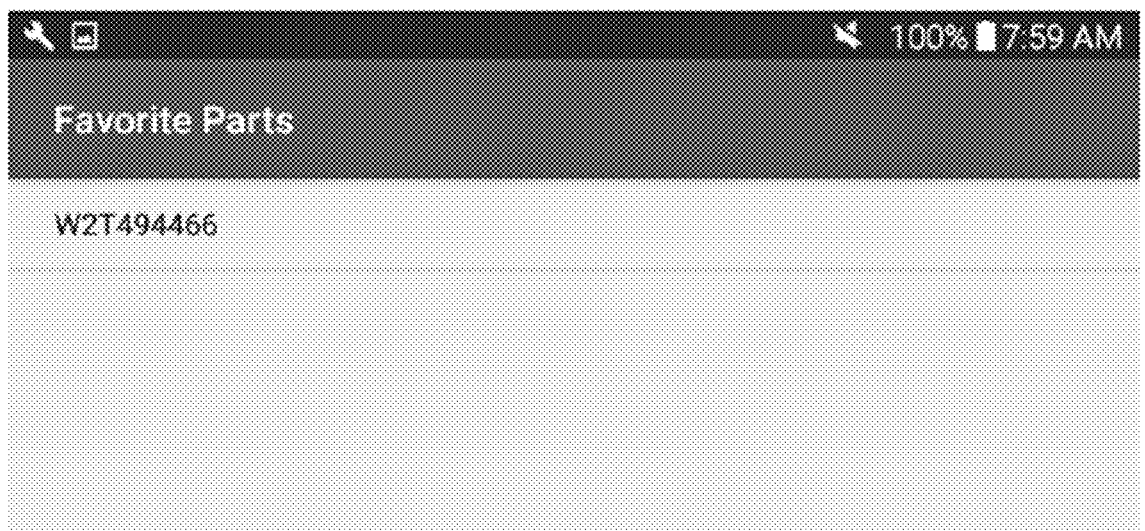
FIG. 10 illustrates a favorite parts screen displayed on an embodiment of a portable electronic device running an embodiment of the software application disclosed herein.

Once a part is added to the favorites list of a user it can be found quickly by selecting the "Favorites" button of the app, which will cause a list of favorite equipment or parts to be illustrated, for example, as shown in FIG. 10.

Figure 11:
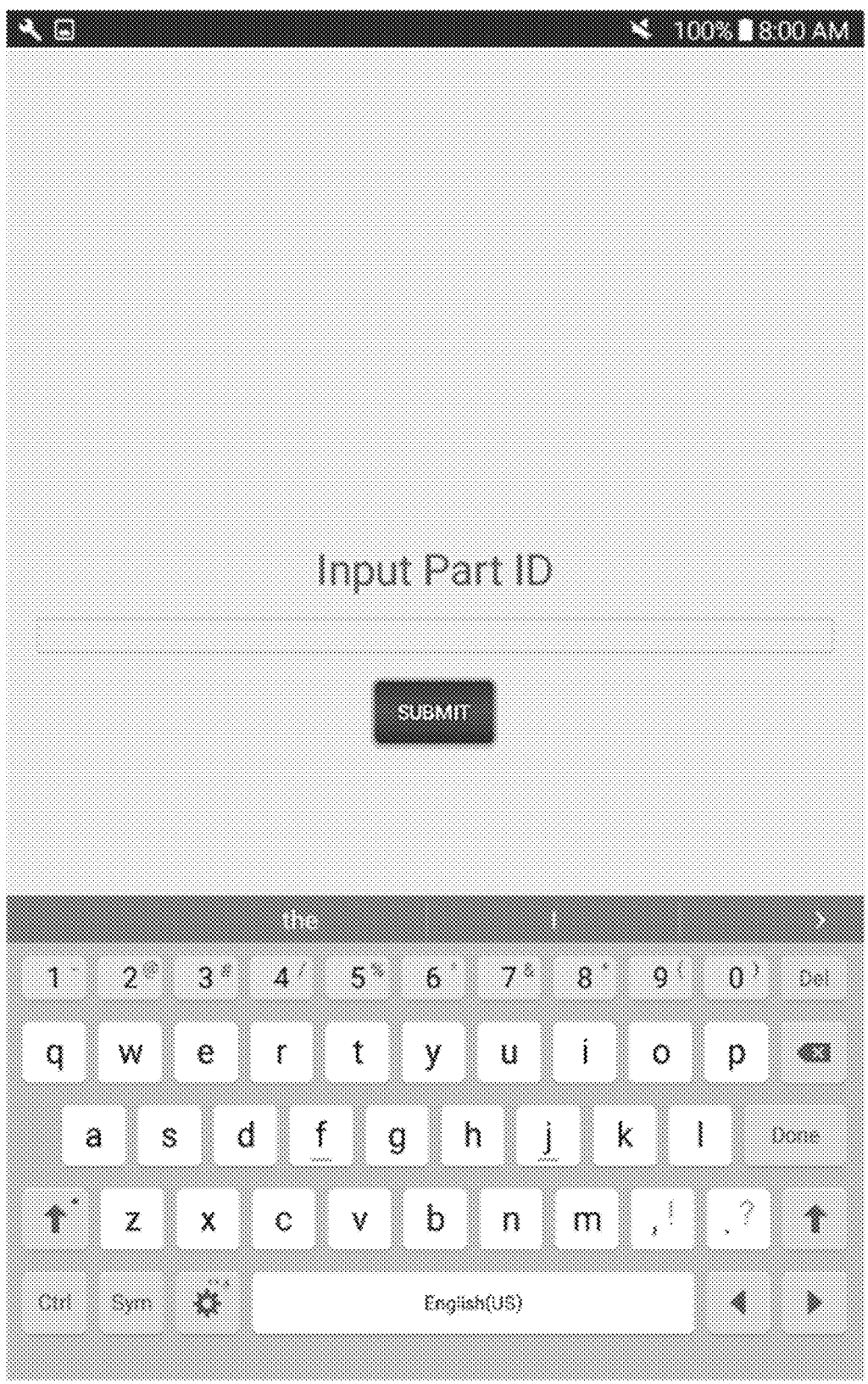
FIG. 11 illustrates a parts search interface displayed on an embodiment of a portable electronic device running an embodiment of the software application disclosed herein.
Figure 12:
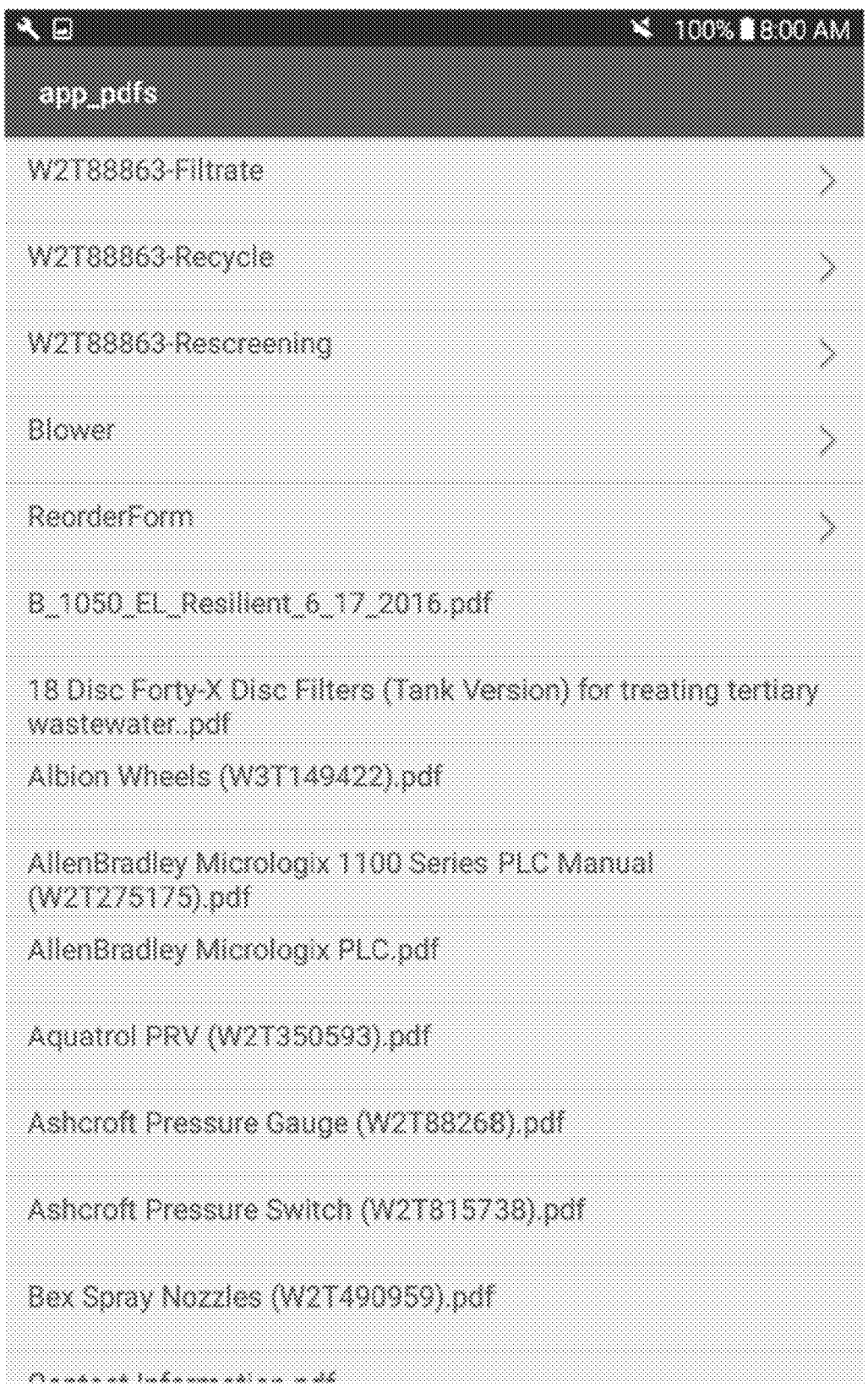
FIG. 12 illustrates a list of locally accessible equipment documentation displayed in an embodiment of a portable electronic device running an embodiment of the software application disclosed herein.

The user can also search for an item by using the "Browse Files" button (FIGS. 4A, 5A, 5B). Selection of the "Browse Files" button may open a part search dialog screen (FIG. 11) or a listing of documents associated with all equipment and parts in the memory of the portable electronic device (FIG. 12). In some embodiments, a user may select the search by part number button and a screen will come up allowing the user to enter a part number if it is known in the event the reference code or image associated with the part or equipment is damaged and unrecognizable.

In some embodiments, a portable electronic device upon which embodiments of the app disclosed herein may be run may include a computerized control system. Various aspects may be implemented as specialized software executing in a general-purpose or specialized computer system 1300 such as that shown in FIG. 13. The computer system 1300 may include a processor 1302 connected to one or more memory devices 1304, such as a disk drive, solid state memory, removable flash drive of SD card, or other device for storing data. Memory 1304 is typically used for storing programs and data during operation of the computer system 1300.

Components of the computer system 1300 may be coupled by an interconnection mechanism 1306, which may include one or more busses (e.g., between components that are integrated within a same machine) and/or a network (e.g., between components that reside on separate discrete machines). The interconnection mechanism 1306 enables communications (e.g., data, instructions) to be exchanged between system components of system 1300. Computer system 1300 includes one or more input devices 1308, for example, a keyboard, mouse, trackball, microphone, or display screen, which may include a touch sensitive screen, through which an operator may issue commands or programming to the system 1300. Computer system 1300 includes one or more output devices 1310, for example, a printing device, display screen, and/or a speaker. One or more sensors 1314 may also provide input to the computer system 1300. These sensors may include, for example, a camera of the portable electronic device or one or more other sensors capable of providing information to the computer system, for example, near field communication circuitry. In addition, the computer system 1300 may contain one or more interfaces that connect computer system 1300 to a communication network in addition to or as an alternative to the interconnection mechanism 1306.

Figure 14:
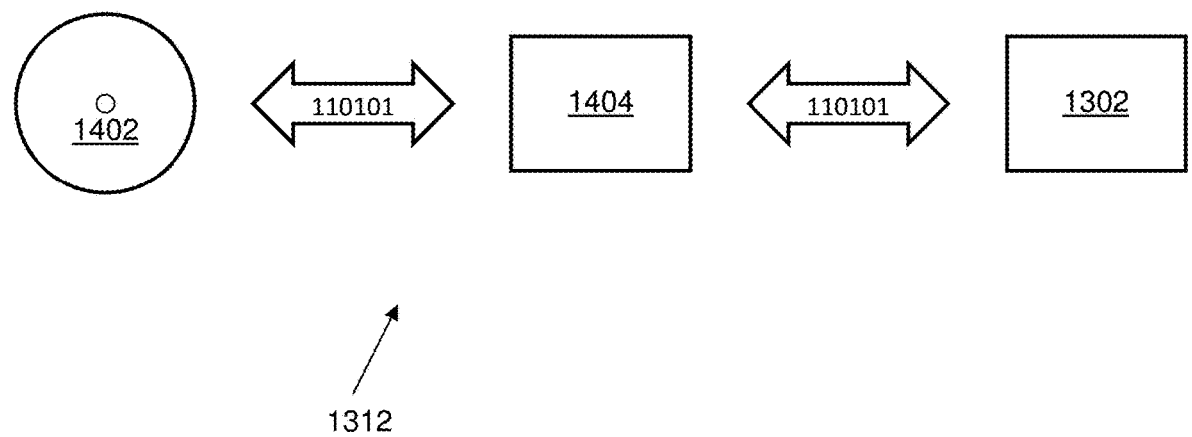
FIG. 14 is a block diagram of a memory system of the computer system of FIG. 13.

The storage system 1312, shown in greater detail in FIG. 14, typically includes a computer readable and writeable nonvolatile recording medium 1402 in which signals are stored that define a program to be executed by the processor or information to be processed by the program. The medium may include, for example, a disk or flash memory. Typically, in operation, the processor causes data to be read from the nonvolatile recording medium 1402 into another memory 1404 that allows for faster access to the information by the processor than does the medium 1402. This memory 1404 is typically a volatile, random access memory such as a dynamic random access memory (DRAM) or static memory (SRAM). It may be located in storage system 1312, as shown, or in memory system 1304. The processor 1302 generally manipulates the data within the integrated circuit memory 1304, 1404 and then copies the data to the medium 1402 after processing is completed. A variety of mechanisms are known for managing data movement between the medium 1402 and the integrated circuit memory element 1304, 1404, and embodiments disclosed herein are not limited to any particular data movement mechanism. Embodiments disclosed herein are not limited to a particular memory system 1304 or storage system 1312.

The computer system may include specially-programmed, special-purpose hardware, for example, an application-specific integrated circuit (ASIC). Embodiments disclosed herein may be implemented in software, hardware or firmware, or any combination thereof. Further, such methods, acts, systems, system elements and components thereof may be implemented as part of the computer system described above or as an independent component.

Figure 13:
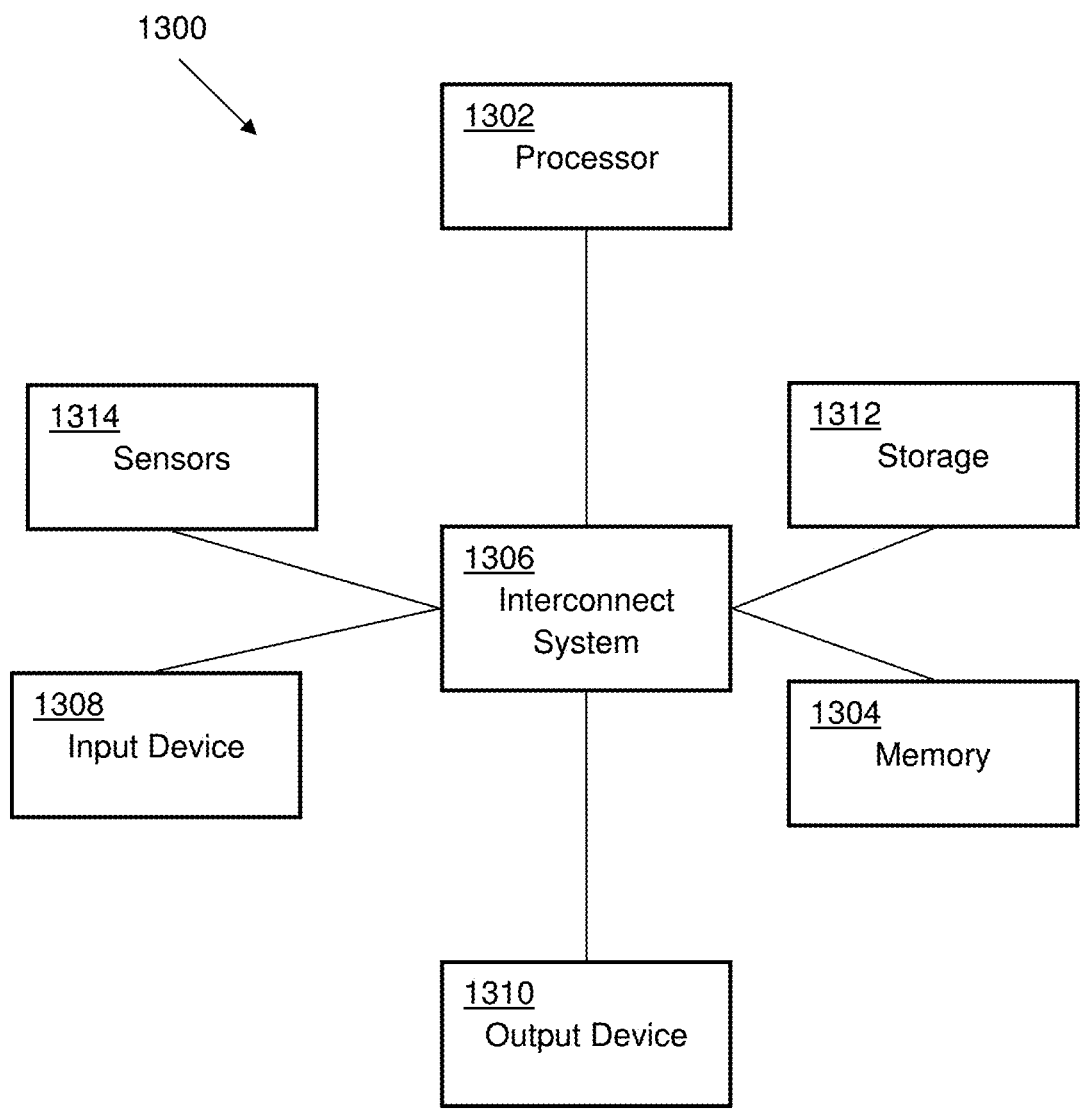
FIG. 13 is a block diagram of a computer system included in embodiments of systems disclosed herein.

Although computer system 1300 is shown by way of example as one type of computer system upon which various embodiments disclosed herein may be practiced, it should be appreciated that the embodiments disclosed herein are not limited to being implemented on the computer system as shown in FIG. 13. Various embodiments disclosed herein may be practiced on one or more computers having a different architecture or components that that shown in FIG. 13.

Computer system 1300 may be a general-purpose computer system that is programmable using a high-level computer programming language. Computer system 1300 may be also implemented using specially programmed, special purpose hardware. In computer system 1300, processor 1302 is typically a commercially available processor such as the well-known Pentium™ or Core™ class processors available from the Intel Corporation. Many other processors are available. Such a processor usually executes an operating system which may be, for example, the Windows 7 or Windows 8 operating system available from the Microsoft Corporation, the MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that embodiments disclosed herein are not limited to a particular computer system platform, processor, operating system, or network. Also, it should be apparent to those skilled in the art that the embodiments disclosed herein are not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various embodiments disclosed herein may be distributed among one or more computer systems configured to provide a service (e.g., servers) to one or more client computers, or to perform an overall task as part of a distributed system. For example, various embodiments disclosed herein may be performed on a client-server system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). In some embodiments one or more components of the computer system 600 may communicate with one or more other components over a wireless network, including, for example, a cellular telephone network.

It should be appreciated that embodiments disclosed herein are not limited to executing on any particular system or group of systems. Also, it should be appreciated that embodiments disclosed herein are not limited to any particular distributed architecture, network, or communication protocol. Various embodiments may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various embodiments disclosed herein may be implemented in a non-programmed environment (e.g., documents created in HTML, XML or other format that, when viewed in a window of a browser program, render aspects of a graphical-user interface (GUI) or perform other functions). Various embodiments disclosed herein may be implemented as programmed or non-programmed elements, or any combination thereof.

Having thus described several aspects of at least one embodiment of this invention, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure, and are intended to be within the scope of the invention. Accordingly, the foregoing description and drawings are by way of example only.

The phraseology and terminology used herein is for the purpose of description and should not be regarded as limiting. As used herein, the term "plurality" refers to two or more items or components. The terms "comprising", "including", "carrying", "having", "containing", and "involving", whether in the written description or the claims and the like, are open-ended terms which mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A portable electronic device comprising:
   a camera;
   a display screen;
   a local memory storing a database of identification information of a plurality of pieces of equipment; and
   a processor configured to:
      search the database and identify a piece of equipment from a comparison between identification information associated with one of an image of the piece of equipment or of a fiducial marker associated with the piece of equipment captured by the camera and the identification information in the database in the local memory;
      display a header page associated with the piece of equipment on the display screen responsive to identifying the piece of equipment, the header page including options for accessing different types of documentation associated with the piece of equipment, the documentation pertaining to at least one of installation, operation, or maintenance for the piece of equipment;
      receive an indication from a user of a type of documentation to access; and
      responsive to receiving the indication of the type of documentation to access:
         retrieve the documentation from the local memory of the portable electronic device without accessing a network or internet connection; and
         display the documentation on the display screen.

2. The portable electronic device of claim 1, wherein the processor is configured to identify the piece of equipment by extracting identification information from the image of the fiducial marker.

3. The portable electronic device of claim 2, wherein the fiducial marker is one of a bar code and a quick response code.

4. The portable electronic device of claim 1, wherein the processor is configured to identify the piece of equipment by comparing the image of the piece of equipment to a library of three-dimensional models of the plurality of pieces of equipment stored in the local memory of the portable electronic device.

5. The portable electronic device of claim 1, further comprising a user interface configured to receive an order for a replacement part for the equipment, wherein the processor is further configured to store the order for the replacement part in the local memory of the portable electronic device while the network or internet connection is unavailable to the electronic device.

6. The portable electronic device of claim 5, wherein the processor is further configured to transmit the order for the replacement part when the network or internet connection becomes available to the portable electronic device.

7. The portable electronic device of claim 1, further comprising a user interface configured to receive a service request for the equipment, wherein the processor is further configured to store the service request in the local memory of the portable electronic device while the network or internet connection is unavailable to the electronic device.

8. The portable electronic device of claim 7, wherein the processor is further configured to transmit the service request when the network or internet connection becomes available to the portable electronic device.

9. A system comprising:
   a plurality of pieces of equipment;
   a set of identifiers, each of the plurality of pieces of equipment being associated with a different identifier in the set of identifiers; and
   a portable computing device including:
      a camera;
      a display screen;
      a local memory storing a database of identification information of the plurality of pieces of equipment; and
      a processor configured to:
         search the database and identify a piece of equipment from a comparison between identification information associated with an image of the identifier associated with the piece of equipment captured by the camera and the identification information in the database in the local memory;

responsive to identifying the piece of equipment, retrieve equipment documentation regarding the piece of equipment from the local memory of the portable computing device, the documentation pertaining to at least one of installation, operation, or maintenance for the piece of equipment, the equipment documentation retrievable responsive to identifying the piece of equipment without access to a network or internet connection; and display the documentation on the display screen.

10. The system of claim 9, wherein the processor of the portable computing device is further configured to display a header page associated with the piece of equipment on the display screen responsive to identifying the piece of equipment, the header page including options for accessing different types of documentation associated with the piece of equipment.

11. The system of claim 10, wherein the processor of the portable computing device is further configured to receive an indication from a user of a type of documentation to access.

12. The system of claim 10, wherein the processor of the portable computing device is further configured to retrieve the equipment documentation responsive to receiving the indication of the type of documentation to access.

13. The system of claim 10, wherein each of the plurality of pieces of equipment has the identifier affixed thereto.

14. The system of claim 10, wherein the set of identifiers is printed on a sheet of paper unaffixed to any of the plurality of pieces of equipment.

15. A method of facilitating off-line accessing equipment information, the method comprising:

providing a portable electronic device including a local memory storing a database of identification information of a plurality of pieces of equipment;

providing an identifier of the equipment;

providing instructions to:

capture an image of the identifier of the equipment with a camera of the portable electronic device; and select a type of equipment information to view from a menu of different types of information associated with the equipment displayed on a user interface of the portable electronic device responsive to capturing the image of the identifier of the equipment and responsive to the portable electronic device searching the database and identifying the equipment from a comparison between identification information associated with the image of the identifier of the equipment and the identification information in the database in the local memory, the selection of the type of equipment causing the portable electronic device to retrieve equipment information regarding the piece of equipment from the local memory, the equipment information comprising documentation pertaining to at least one of installation, operation, or maintenance for the equipment, the equipment information retrievable responsive to the selection of the type of equipment without access to a network or internet connection.

16. The method of claim 15, further comprising providing instructions to affix the identifier of the equipment to the equipment.

17. The method of claim 15, further comprising downloading the equipment information from a computer system of a vendor of the equipment to the portable electronic device.

18. The method of claim 17, further comprising downloading the equipment information from the computer system of the vendor of the equipment to a removable memory device that is later coupled to the portable electronic device.

19. The method of claim 17, wherein the computer system of the vendor determines what equipment to download information for based on a maintenance or service job number provided to the computer system of the vendor.

* * * * *